Aug. 11, 1964 R. BARRETT 3,144,607

CARRIER COMMUNICATION SYSTEMS WITH REPEATER STATIONS

Filed Jan. 16, 1961

INVENTOR
ROBERT BARRETT
BY Kirschstein, Kirschstein & Ottinger
ATTORNEYS 3,144,607
Patented Aug. 11, 1964

3,144,607

CARRIER COMMUNICATION SYSTEMS WITH REPEATER STATIONS

Robert Barrett, Coventry, England, assignor to The General Electric Company Limited, London, England Filed Jan. 16, 1961, Ser. No. 82,910
Claims priority, application Great Britain Jan. 15, 1960
2 Claims. (Cl. 325—5)

This invention relates to electric carrier communication systems.

More particularly the invention is concerned with carrier communication systems of the kind in which at least one repeater station is provided between the terminal stations of the system while the transmission path on either side of said repeater station for the transmission of carrier signals is of the type comprising two separate conductors. On each side of the repeater station the transmission path may, for example, be provided by a pair of conductors in a multi-pair cable or by a coaxial pair.

One object of the present invention is to provide an improved carrier communication system of the kind specified.

In a carrier communication system of the kind specified, it is well known to utilise for an auxiliary channel (sometimes known as an "engineer's channel") part of the frequency spectrum below that required for normal carrier communication. This auxiliary channel is usually arranged at each repeater station to by-pass the carrier signal amplifier with the result that the auxiliary channel is not interrupted if a repeater station is faulty or is otherwise inoperative.

Another object of the present invention is to provide a carrier communication system of the kind specified which has provision for an auxiliary channel and which has an improved performance at least as far as the auxiliary channel is concerned.

In previously known carrier communication systems having a plurality of repeater stations, it has usually been necessary to isolate the sections of cable between adjacent pairs of repeater stations in turn when testing for a cable fault. This is clearly a tedious procedure if there are a large number of repeater stations and another object of the invention is to provide a system which enables a simpler method of testing for cable faults to be employed.

In an electric carrier communication system which is of the kind specified and which is in accordance with the present invention, the said repeater station is provided with a path which by-passes the carrier signal amplifier of the station in respect of a band of frequencies below the band for normal carrier communication and which is inductively loaded.

This loading serves to reduce the overall attenuation, at frequency in said relatively low frequency band, of the through-circuit formed by the relay station and said transmission path on either side of the relay station. This through-circuit may be utilised for carrying an auxiliary channel as aforesaid and/or for testing for cable faults.

One example of a multi-channel carrier telephony system in accordance with the present invention will now be described with reference to the accompanying drawing in which.

In the system now to be described, there are a plurality of like repeater stations which are connected in cascade between the terminal stations of the system, each repeater station being arranged to amplify carrier frequency signals sent from the transmitting terminal station to the receiving terminal station. Adjacent stations of the system are connected by coaxial pairs in order to provide the required carrier frequency circuit between the terminal stations.

Figure 1:
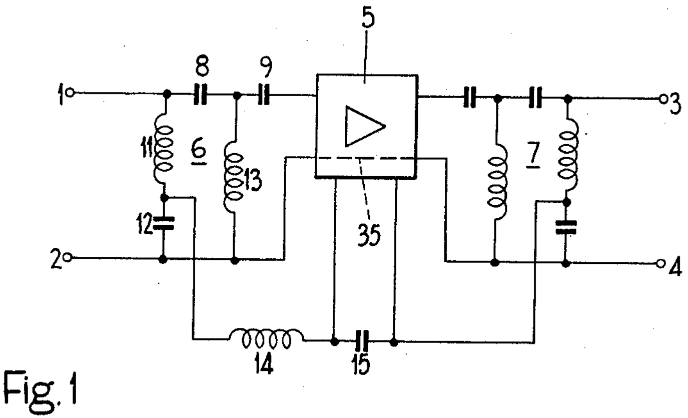
FIGURE 1 shows the circuit of part of the apparatus at a repeater station.

Referring now to FIGURE 1 of the accompanying drawing, the apparatus at each of said repeater stations comprises a pair of input terminals 1 and 2 and a pair of output terminals 3 and 4, each of these pairs of terminals being connected to the coaxial pair (not shown) joining that repeater station to the adjacent station and the terminals 1 and 3 being connected to the inner conductors of the appropriate coaxial pairs. Repeater equipment 5 comprising an amplifier, together possibly with an equaliser or line regulator, is connected in a path between the input terminals 1 and 2 and the output terminals 3 and 4, this path also containing two high-pass filters 6 and 7. During operation of the repeater station, carrier frequency signals supplied to the input terminals 1 and 2 are amplified by said amplifier and then passed to the output terminals 3 and 4.

The high-pass filter 6 connected between the input terminals 1 and 2 and the amplifier 5 is a purely passive four-terminal network and comprises two capacitors 8 and 9 which are connected in series between the input terminal 1 on the one hand and the equipment 5 on the other hand. A shunt arm of the network is formed by an inductor 11 and a capacitor 12 connected in series, as shown in the drawing, between the input terminals 1 and 2 while another shunt arm is formed by a further inductor 13 connected between the junction of the two series-connected capacitors 8 and 9 and the input terminal 2.

The other high-pass filter 7 is identical to the filter 6 although it is connected the other way round so that corresponding points in the two filters 6 and 7 are connected to the input terminals 1 and 2 and to the output terminals 3 and 4 respectively.

A loading coil 14 and a further capacitor 15 (the purpose of which will be explained hereinafter) are connected in series between the junction of the inductor 11 and the capacitor 12 in the filter 6 and the corresponding point on the filter 7. There is thereby provided a relatively low frequency connection between the input terminals 1 and 2 and the output terminals 3 and 4.

It follows from the above that there is established a relatively low frequency circuit between the terminal stations of the system without passing through any of the repeater station amplifiers. Furthermore the provision of loading coils, such as the coil 14, one at each repeater station serves to reduce the attenuation of this circuit. This circuit may be utilised to carry an engineer's speech channel which is preferably two-way. This channel is between the transmitting terminal station and any one of the repeater stations, as required, and since no amplifiers are connected in this channel, any amplification that is required must be provided in the telephone sets used.

In the system under consideration, power for operating the amplifiers at all the repeater stations is supplied as direct current from the transmitting station by way of said coaxial pairs joining the stations. At the repeater station shown in FIGURE 1, for example, the supply to the amplifier of that station is taken from across the capacitor 15 which is connected in series with the loading coil 14. The value of this capacitor 15 is so chosen that it effectively by-passes the amplifier at audio frequencies, say above 100 cycles per second. It will however be appreciated that, as far as their supplies are concerned, the amplifiers of all the repeater stations are effectively connected in series.

Figure 2:
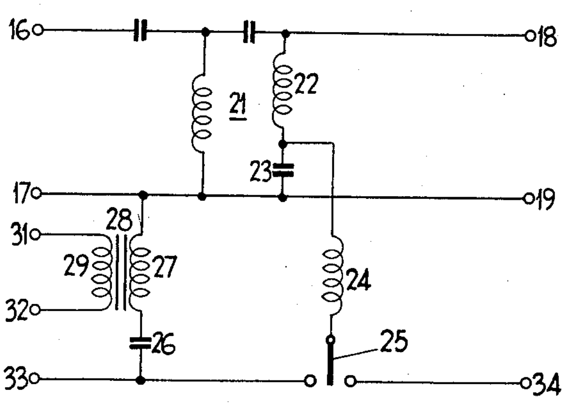
FIGURE 2 shows digrammatically part of the apparatus at a terminal station.

Referring now to FIGURE 2, the transmitting terminal station has a pair of terminals 16 and 17 to which are supplied the carrier frequency signals to be transmitted over the system and a pair of terminals 18 and 19 which are connected to the inner and outer conductors respectively of the coaxial pair (not shown) joining the transmitting terminal station to the adjacent repeater station. A high-pass filter 21 is connected between the terminals 16 and 17 on the one hand, and the terminals 18 and 19 on the other hand, this filter being identical with the filters 6 and 7 previously described.

The junction of the inductor 22 and capacitor 23 of the high-pass filter 21 is connected by way of a loading coil 24, a two-position switch 25, a capacitor 26 and winding 27 of a transformer 28 to the terminals 17 and 19 which are connected together. Another winding 29 of the transformer 28 is connected between a pair of terminals 31 and 32, the two-way speech circuit (not shown) of the engineer's channel being connected to the terminals 31 and 32. (If the engineer's channel is provided to the repeater station of FIGURE 1, a capacitor (not shown) is connected in like manner in series with one winding of a transformer (not shown) between the terminal 2 and the junction of the coil 14 and the capacitor 15, the two-way speech circuit at this station being connected to a second winding of this transformer.)

The junction of the inductor 22 and capacitor 23 is also connected by way of the loading coil 24 and switch 25 to another terminal 33 to which is fed the direct current supply for operating the repeater station amplifiers. The source of direct current connected between the terminals 17 and 33 has a high audio frequency impedance so that it does not by-pass the speech signals of the engineer's channel. The return path for the direct current supply is via the outer conductors of said coaxial pairs and it will therefore be appreciated that the repeater equipment at each of the repeater stations fed with this supply must have a direct current path, for example as shown by the broken line 35 in FIGURE 1, while the furthest such station has a direct current path, for example formed by an inductor, connected across the output side of its repeater equipment.

When the switch 25 is moved to an alternative position to that shown in FIGURE 2, said relatively low frequency circuit through all the repeater stations is brought out to a test point 34 while the direct current supplies and the engineer's channel are then interrupted. With the switch 25 in this position, it is possible to locate a cable fault by means of test equipment connected to the test point 34. The method for testing for such a fault may be to measure the impedance/frequency characteristic at the test point 34, and to deduce the position of a fault from the spacing of peaks and troughs in the characteristic.

It will be appreciated that, in practice, it is usually desirable to feed direct current to some of the relay stations from one end of the system and to some from the other end, and in that case the receiving terminal station is arranged in the manner discussed above. Furthermore the system as a whole may be duplicated, using further coaxial pairs, to enable transmission also to be effected between the terminal stations in the opposite direction.

In one example of the system described above the lowest frequency of the carrier frequencies to be transmitted is 60 kilocycles per second and the high-pass filters 6, 7 and 21 have a cut-off frequency of approximately 30 kilocycles per second. The loading coils may be such that the engineer's channel has a cut-off frequency of about 2,300 cycles per second.

I claim:

1. Repeater station apparatus for an electric carrier communication system comprising a pair of input terminals to which is supplied an input signal including direct current, audio frequency and carrier frequency components, first filter means to derive from the input signal two signals, one of which comprises the carrier frequency component of the input signal and the other of which comprises the direct current and audio frequency components of the input signal, second filter means, an amplifier connected between the first filter means and the second filter means to amplify the carrier frequency signal, a purely passive audio frequency and direct current path which is connected between the first filter means and the second filter means to carry the signal comprising the direct current and audio frequency components of the input signal, a pair of output terminals, and circuit means connecting the second filter means and the output terminal so as to supply thereto both the amplified carrier frequency signal and the signal comprising the direct current and audio frequency components of the input signal, said purely passive path comprising a loading inductor, a capacitor connected in series with the loading inductor to provide with the loading inductor a circuit for the audio frequency component of the input signal, and circuit means connecting the two sides of the capacitor to said amplifier to provide with the loading inductor a circuit for the direct current component of the input signal which component serves to energize said amplifier.

2. An electric carrier communication system comprising first and second terminal stations and at least one repeater station which is provided between the terminal stations and which is connected thereto by way of two-conductor transmission paths for passing signals from the first terminal station to the second terminal station; the first terminal station comprising a pair of output terminals conneced to the two-conductor path, means to supply a carrier frequency signal to said pair of output terminals, means to supply an audio frequency signal to said pair of output terminals and means to supply a direct current to said pair of output terminals; and the repeater station comprising a pair of input terminals connected to the two-conductor path so as to receive therefrom an input signal including said direct current, audio and carrier frequency signals, first filter means to derive from the input signal two signals one of which comprises the carrier frequency signal and the other of which comprises the direct current and the audio frequency signal, second filter means, an amplifier connected between the first filter means and the second filter means to amplify the carrier frequency signal, a purely passive audio frequency and direct current path which is connected between the first filter means and the second filter means to carry both the direct current and the audio frequency signal, a pair of output terminals, and circuit means connecting the second filter means and the output terminals so as to supply thereto both the amplified carrier frequency signal and the signal comprising the direct current and the audio frequency signal, said purely passive path comprising a loading inductor, a capacitor connected in series with the loading inductor to provide with the loading inductor a circuit for the audio frequency signal, and circuit means connecting the two sides of the capacitor to said amplifier to provide with the loading inductor a circuit for the direct current, which serves to energize the amplifier.

References Cited in the file of this patent

UNITED STATES PATENTS

| | | |
|---|---|---|
| 1,443,984 | Espenschied | Feb. 6, 1923 |
| 1,950,127 | Strieby | Mar. 6, 1934 |
| 2,854,514 | Ensink et al. | Sept. 30, 1958 |
| 3,064,195 | Freen | Nov. 13, 1962 |
| 3,089,004 | Oswald | May 7, 1963 |
| 3,105,125 | Kassig | Sept. 24, 1963 |

FOREIGN PATENTS

| | | |
|---|---|---|
| 1,091,007 | France | Apr. 6, 1955 |